(12) United States Patent
Doerffel et al.

(10) Patent No.: US 6,655,425 B2
(45) Date of Patent: Dec. 2, 2003

(54) DEVICE FOR CHARGING A BULK MATERIAL INTO A CONTAINER AND METHOD FOR THE USE THEREOF

(75) Inventors: Wolfgang Doerffel, Dresden (DE); Siegfried Krieger, Dresden (DE)

(73) Assignee: Glatt Systemtechnik GmbH, Dresden (DE)

( * ) Notice: Subject to any disclaimer, the term of this patent is extended or adjusted under 35 U.S.C. 154(b) by 0 days.

(21) Appl. No.: 10/129,090

(22) PCT Filed: Sep. 7, 2001

(86) PCT No.: PCT/DE01/03478

§ 371 (c)(1),
(2), (4) Date: Sep. 23, 2002

(87) PCT Pub. No.: WO02/20383

PCT Pub. Date: Mar. 14, 2002

(65) Prior Publication Data

US 2003/0075238 A1 Apr. 24, 2003

(51) Int. Cl.[7] .................................................. B65B 31/00
(52) U.S. Cl. .............................. 141/286; 141/8; 141/65; 141/83
(58) Field of Search ................................. 141/8, 59, 65, 141/83, 93, 286

(56) References Cited

U.S. PATENT DOCUMENTS

| 3,881,610 A | 5/1975 | Hessling | |
|---|---|---|---|
| 4,969,494 A | * 11/1990 | Chefson | 141/93 |
| 5,052,451 A | * 10/1991 | Gentilcore et al. | 141/67 |
| 5,415,512 A | 5/1995 | Buchfink | |
| 5,531,252 A | * 7/1996 | Derby et al. | 141/67 |

FOREIGN PATENT DOCUMENTS

| DE | 72 18 354 | 1/1973 |
|---|---|---|
| DE | 37 08 653 | 9/1988 |
| DE | 42 11 855 | 10/1993 |

* cited by examiner

*Primary Examiner*—Gene Mancene
*Assistant Examiner*—Peter deVore
(74) *Attorney, Agent, or Firm*—Jacobson Holman PLLC

(57) ABSTRACT

The apparatus has a closed housing (4, 29), one side of the housing (4, 29) being the filling side (13), which, during filling of the container (2), is located opposite an introduction opening (6) provided in said container. The housing (4) has a filling tube (3, 33) passing through it axially in relation to the axis of the introduction opening (6), said filling tube, on the filling side (13), protruding to such an extent that, in the filling position, projects into the introduction opening (6). The interior of the housing (4, 29) is connected to an external arrangement for extracting dust by suction, and the filling side (13) has an air-inlet opening.

Figure 1:
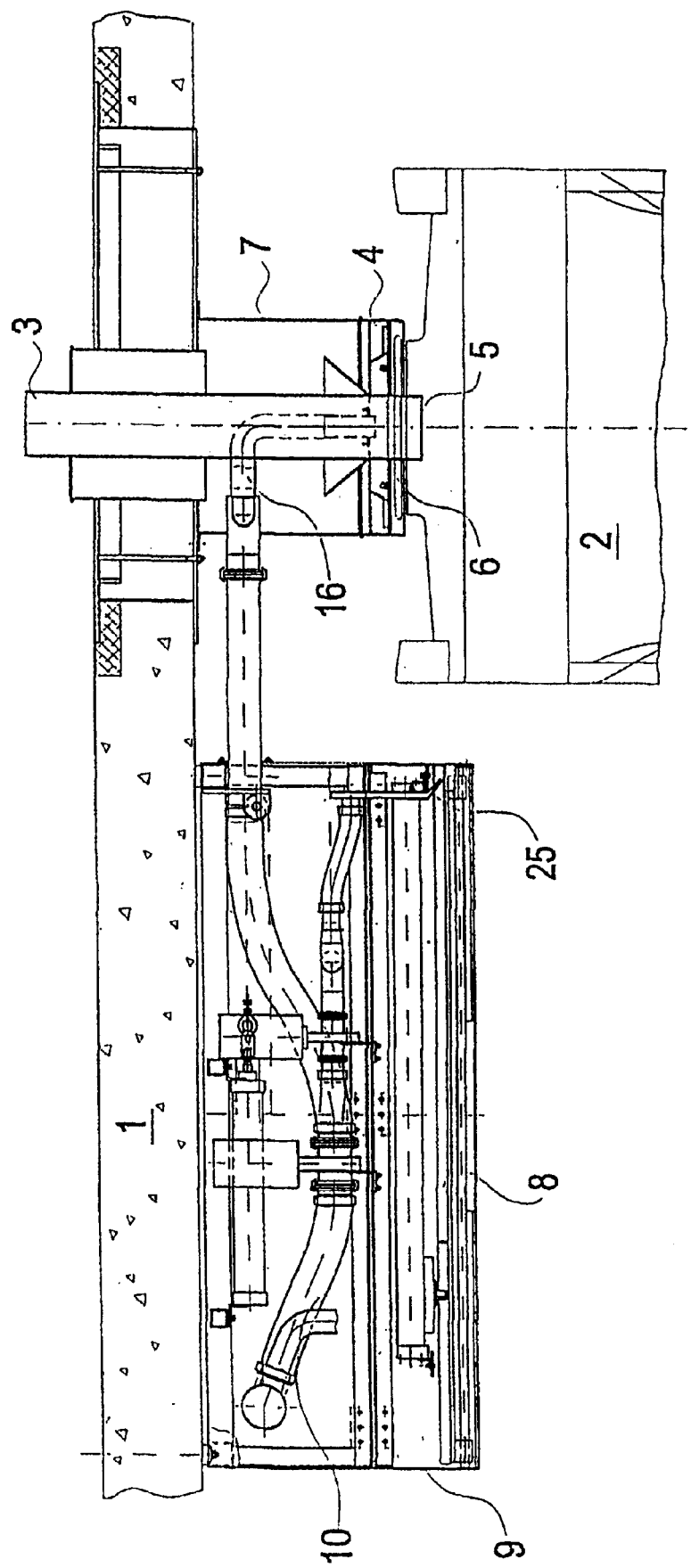

In respect of the process, for the purpose of filling the container (2), the filling side (13) of the housing (4) is positioned above the introduction opening (6) of the container (2) such that a gap (a) is produced between the filling side (13) and the introduction opening (6), and the arrangement for extracting dust by suction is set in operation at least during filling of the container (2).

8 Claims, 3 Drawing Sheets

DEVICE FOR CHARGING A BULK MATERIAL INTO A CONTAINER AND METHOD FOR THE USE THEREOF

This is a nationalization of PCT/DE01/03478 filed Sep. 7, 2001 and published in German.

TECHNICAL FIELD

The invention relates to an apparatus for introducing bulk goods into a container, the apparatus having an arrangement for extracting dust, which can pass into the surroundings during filling of the container, by suction. The invention also relates to a process for using an apparatus according to the invention.

PRIOR ART

Various apparatuses for introducing bulk goods into containers are known from the prior art. Relevant apparatuses in the present case are those which are suitable for dust-containing bulk goods or for bulk goods in which dust may be produced, for example, by abrasion during transfer.

Open ventilator cowls, which are arranged above the filling location, are known in general.

DE 42 11 855 A1 describes an arrangement for loading bulk goods. In one embodiment, a dust-removal nozzle is provided in the region where the bulk goods enter the loading arrangement. A dust-return line results in dust-laden air being returned from the container which is to be loaded into the loading hopper of the loading arrangement. During operation of the arrangement, the dust within the loading arrangement is directed to the dust-removal nozzle by way of the air stream, a negative pressure being present in the interior of the arrangement. During loading of the bulk goods, the arrangement is coupled with dust-sealing action to the container which is to be loaded. In this case, the hopper mouth and the dust-return line are introduced in parallel into the opening of the container which is to be loaded.

DE 72 18 354 U1 describes a loading arrangement for loading silos with bulk goods in a dust-free manner. The loading arrangement has a filling tube, of which the bottom end is enclosed by a rubber-coated loading cone. The loading cone, which is arranged in the form of a ring around the filling tube, simultaneously serves as a dust-removal nozzle, which is connected functionally to a suction-extraction and dust-removal apparatus via a folding bellows. During the sealing operation, the loading cone is seated firmly, in a dust-sealed manner, in the introduction hole of the silo.

The disadvantage here is that it is not possible to prevent at least some dust from escaping into the surroundings, or relatively high-outlay sealing of the hopper mouth and of the dust-return line in relation to the opening of the container which is to be loaded is necessary. It is also disadvantageous that coupling the arrangement and the dust-return line to the container which is to be loaded results in connecting forces taking effect, as a result of which it is not possible for the net filling quantity to be determined precisely during filling.

DESCRIPTION OF THE INVENTION

It is thus an object of the invention to specify an apparatus for introducing bulk goods into a container of the type mentioned in the introduction which prevents dust from the bulk goods from entering into the surroundings. It also intended to specify a process for using the apparatus. It is also intended to be possible here for the net filling quantity to be determined precisely during introduction of the bulk goods into the container.

The invention achieves the object in respect of the apparatus by the features mentioned in the defining part of claim 1. Advantageous developments of the apparatus are defined in subclaims 2 to 6 and are illustrated in more detail hereinbelow together with the description of the preferred configuration of the invention, including the drawing.

The object in respect of the process is achieved by the defining part of claim 7. An advantageous development of the process is defined in subclaim 8.

The essence of the invention consists, in particular, in that the apparatus has a housing, of which the interior is connected to an external arrangement for extracting dust by suction, in that the sealing tube is mounted within the housing, and in that air-inlet openings are provided in the housing radially outside the introduction housing of the container which is to be filled.

In the case of the process-related use of the apparatus for filling a container with bulk goods, the apparatus, specifically the filling side of the housing, is positioned above the container, i.e. above the introduction opening of the latter, such that a defined gap is produced between the housing and the container. In respect of the process, it is further the case that the arrangement for extracting dust by suction is set in operation.

The arrangement for extracting dust by suction produces a negative pressure in the housing of the apparatus, which results in air from the surroundings flowing into the housing, by way of the air-inlet openings, on the filling side. A collar is advantageously arranged on the filling side of the housing, radially outside the introduction opening of the container and the air-inlet openings. In the filling position, this collar is intended to project axially beyond the outer border of the introduction opening. As a result, the air stream is deflected essentially in a vertical direction and swirling of the air, which possibly results in dust passing into the surroundings, is avoided.

The air stream flows around the introduction opening of the container in tubular fashion. This results in all the dust particles and gases escaping from the container during filling of the latter being entrained. The escape of dust from the gap between the apparatus and the introduction opening is more or less prevented by the air stream.

In an advantageous configuration, the filling tube is arranged such that it can easily be removed from the housing. For this purpose, the filling tube is mounted in the housing, and sealed in relation to the latter, by means of rubber sleeves. This reduces any vibrations in relation to the apparatus during the bulk-goods transfer. The filling tube can easily be drawn out of the housing.

This is advantageous, for example, if the apparatus is to be used for transferring different bulk goods, using different filling tubes, at successive points in time. In particular in the case of pharmaceutical bulk goods, e.g. powder or granules, it is necessary from a technological point of view for the entire apparatus to be cleaned cyclically. For this purpose, it is necessary for the apparatus, including the filling tube, to be dismantled and fed to a washing apparatus.

The actual design of the housing with the filling tube and air-guiding means can be varied to a great extent and adapted to the geometrical and structural conditions.

When the apparatus is in the rest position, i.e. when there is no container which is to be filled positioned beneath the apparatus, it has proven advantageous to arrange a protecting means beneath the housing and, in particular, beneath the outlet opening of the filling tube. This prevents residues of the bulk goods from trickling accidentally into the open from the filling tube, or prevents dust deposits from dropping out of the filling tube and contaminating the surroundings.

The extent to which it is necessary to allow the arrangement for extracting dust by suction to function even when the outlet opening of the filling tube is actually closed is determined by the actual technological conditions.

Protecting means which may be used are slide-like, shutter-like, pivoting-plate-like or iris-diaphragm-like means, as are known in general from the prior art. The selection in practice is decisively influenced by the local conditions. The protecting means is advantageously mounted in a dedicated housing. When not in use, it can be retracted into the housing. It is possible here to provide in the housing special suction slots, by means of which any residues of bulk goods present are extracted by suction during retraction of the protecting means.

Figure 2:
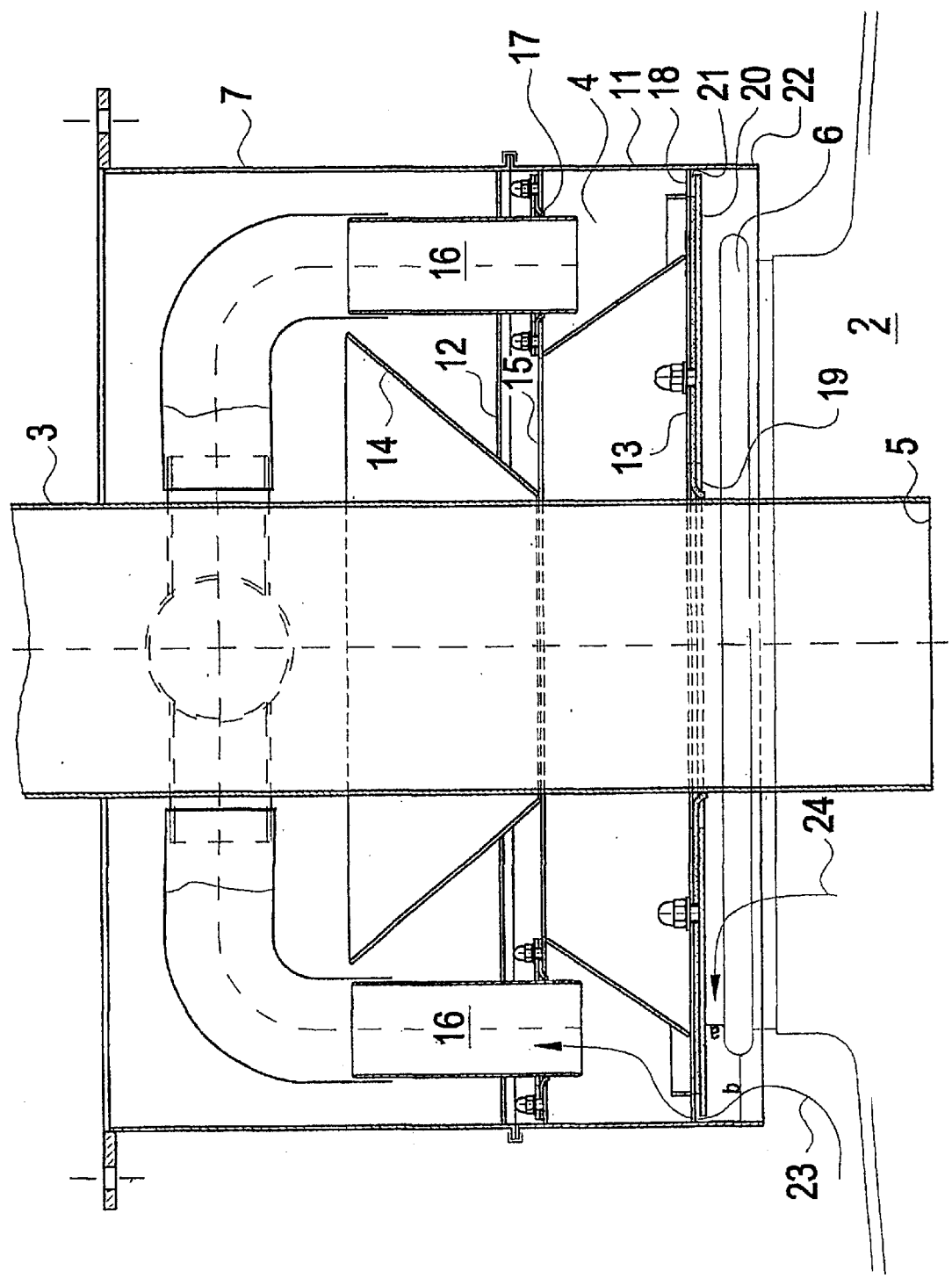
Figure 3:
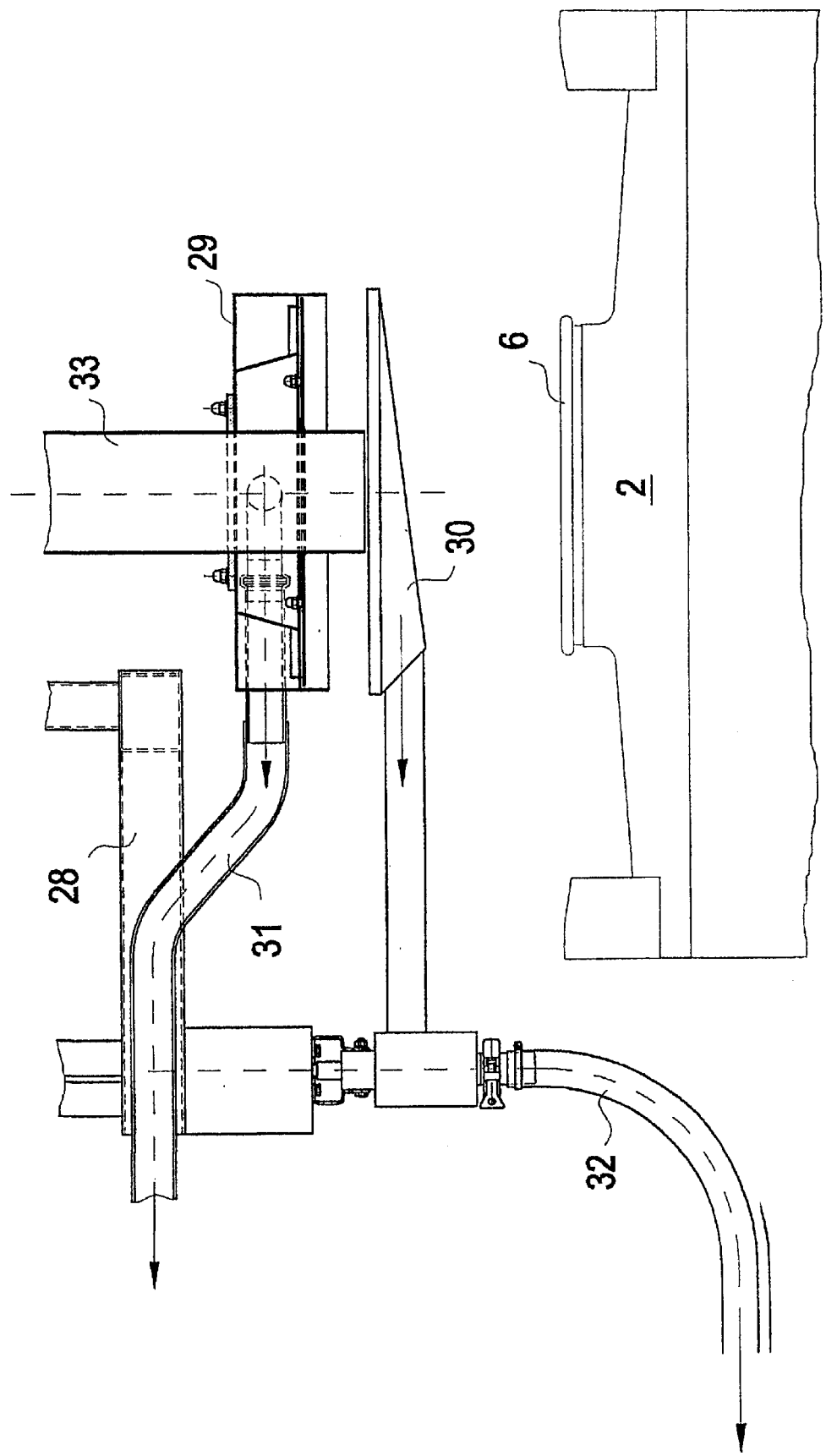

The invention is explained in more detail hereinbelow with reference to two exemplary embodiments. In the associated drawing:

FIG. 1 shows, in respect of exemplary embodiment I, an apparatus according to the invention arranged on the ceiling, FIG. 2 shows a section through the housing according to FIG. 1, and FIG. 3 shows, in respect of exemplary embodiment II, a floor-supported apparatus according to the invention.

EXEMPLARY EMBODIMENT I

FIG. 1 shows, in respect of exemplary embodiment I, an apparatus according to the invention which is arranged on a ceiling 1. Non-illustrated silos or installations for producing a pharmaceutical powder as the bulk goods may be located above the ceiling. This powder is intended to be transferred into the container 2 beneath the ceiling 1. In this case, the container 2 is mounted on weighing scales, which are intended to determine the precise net filling quantity of powder.

The actual apparatus according to the invention comprises a closed housing 4 with air-intake tubes 16 and an annular gap 21. Leading through the housing 4 is a filling tube 3, of which the outlet opening 5 penetrates into the introduction opening 6 of the container 2.

The housing 4 is secured on the ceiling 1 via a load-bearing apparatus 7. A slide 8 is arranged, as protecting means, to the side of the housing 4 and of the outlet opening 5. In the rest position, when there is no container 2 located beneath the filling tube 3, the outlet opening 5 may thus be covered from beneath such that the residues of bulk goods cannot trickle onto the floor from the ceiling tube 3 and the housing 4 as a whole. The slide 8 can easily be moved beneath the housing 4 with the filling tube 3.

FIG. 2 illustrates in more detail the apparatus in the region of the housing 4. In this case, chain-dotted lines are used to indicate the container 2 with the introduction opening 6.

The housing 4 essentially comprises an outer cylinder 11, which is connected in structural terms to the load-bearing apparatus 7, the top covering plate 12 and the filling side 13. The filling tube 3 passes through the housing 4 centrally from above. In this case, the filling tube 3 leads, via a guide hopper 14, through the top covering plate 12 and passes out of the filling side 13 again at the bottom. The length of the filling tube 3 from the outlet on the filling side 13 as far as the outlet opening 5 is dimensioned such that the air with dust particles which escapes from the container 2 during filling, as far as possible, does not swirl up the bulk-goods stream.

A guide hopper 14 serves as an auxiliary means for introducing the filling tube 3 into the housing 4 when the filling tube is exchanged or when it is inserted into the housing 4 again following necessary cleaning.

Located within the housing 4 is a retaining plate 15 which is concentric with the filling tube 3 and in the outer region of which two mutually opposite air-intake tubes 16 open out and are secured there with the interposition of rubber sleeves 17. The air-intake tubes 16 are connected, via the tube elements 10 (FIG. 1), to an arrangement for extracting dust by suction (not illustrated).

The filling side 13 of the housing 4 is a combination of a bottom covering plate 18, a rubber sleeve 19 and a flow plate 20.

The bottom covering plate 18 ensures the necessary mechanical stability of the filling side 13. The rubber sleeve 19 secures the filling tube 3 centrally and elastically and seals it at the same time. The flow plate 20 secures the rubber 19 on the bottom covering plate 18 and defines, with its outer edge, an annular gap 21 in relation to a collar 22. The collar 22 here is an extension of the outer cylinder 11, which projects axially beyond the introduction opening 6 in the container 2.

The slide 8 is secured in a housing 9, into which it can be retracted when not in use. In the exemplary embodiment, the housing 9 also accommodates tube elements 10 of the apparatus for extracting dust by suction. In this case, the interior of the housing 9 is also connected to the arrangement for extracting dust by suction. Located on the side from which the slide 8 is moved out of and into the housing 9 are suction slots 25, which are likewise connected to the apparatus for extracting dust by suction, and by means of the configuration of which any residues of bulk goods present on the slide 8 are extracted by suction when the slide is retracted into the housing 9.

The process-related use of the apparatus according to the invention is described in more detail hereinbelow.

For the purpose of filling with the pharmaceutical powder, the container 2 is positioned axially beneath the filling tube 3. In this case, the container 2 is mounted on weighing scales. The arrangement for extracting dust by suction is set in operation, if this has not already been done. This produces, in the housing 4, a negative pressure which, in turn, produces an air stream through the annular gap 21. Thereafter, the slide 8 is moved from the position beneath the outlet opening 5 of the filling tube 3 into the position within the housing 9.

The container is subsequently raised, via a lifting apparatus (not illustrated), until the spacing a (FIG. 2) between the filling side 13 and the introduction opening 6 has assumed a defined magnitude. A tubular vertical air stream 23 forms in this position, said air stream leading from the surroundings by way of the annular gap b, which is formed between the collar 22 and the outer border of the introduction opening 6, via the annular gap 21 into the housing 4 and then into the air-intake tube 16.

The spacing a is selected in dependence on the annular gap b, and on the rest of the geometrical conditions, such that the air stream 24, which escapes from the container 2 as dust-laden waste air during filling, is entrained by the air stream 23 and cannot pass into the surroundings.

During filling of the container 2, it is the case, in respect of the process, that the abovedescribed weighing scales are used for the purpose of constantly determining the overall weight of the container 2 with the bulk goods and, by subtracting the mass of the container 2, determining the precise net filling quantity of the bulk goods. The operation of filling the container 2 is completed when the precise predetermined net filling quantity has been reached.

The advantage of the invention consists, in particular, in that, during filling of the container 2 involving a relatively large amount of dust being developed, no dust passes into the surroundings, and it is possible for the dust to be reliably disposed of via the apparatus for extracting dust by suction. Furthermore, a predetermined net filling quantity can be introduced into the container 2 with a high level of accuracy. This is possible since there is no force-fitting connection between the container 2 and the apparatus according to the invention. This also means that the container 2 is not subjected to any undefined vertical forces which are able to falsify the measured values during the weighing operation.

Exemplary Embodiment II

FIG. 3 illustrates a floor-supporting apparatus according to the invention. The support 28 is only indicated in part. Its actual form is adapted to the conditions. Secured on the support 28 are a housing 29, a protecting means, in the form of a pivoting plate 30, and pipelines 31 and 32, which lead to an arrangement for extracting dust by suction. A filling tube 33 is routed through the housing 29. The specific design of the housing 29 is largely similar to the housing 4 in exemplary embodiment I.

In FIG. 3, a container 2 with an introduction opening 6 is located in a lowered position in relation to the housing 29, and the protecting means 30 is located beneath the housing 29 and the filling tube 33. In this case, in exemplary embodiment II, the entire plate-like protecting means 30 is connected, via the pipeline 32, to the arrangement for extracting dust by suction, and residues of bulk goods dropping out of the filling tube 33 or of the housing 29 are immediately extracted by suction.

Of course, the invention is not restricted to the exemplary embodiment described. It is thus readily possible for the individual parts to be adapted in a variable manner to the local conditions.

What is claimed is:

1. An apparatus for introducing bulk goods into a container (2), comprising an external arrangement for extracting dust by suction, a closed housing (4, 29), of which the interior is connected to the arrangement for extracting dust by suction and which has a filling side (13) which, during filling of the container (2), is located opposite an introduction opening (6) provided in said container, also comprising a filling tube (3, 33), which passes through the housing (4) axially in relation to the axis of the introduction opening (6) and protrudes to such an extent that, in the filling position, it projects into the introduction opening (6), and further comprising an air-inlet opening on the filling side (13), wherein the air-inlet openings are arranged radially outside the introduction opening (6).

2. The apparatus as claimed in claim 1, wherein the air-inlet openings are designed in the form of an annular gap (21).

3. The apparatus as claimed in claim 1, wherein provided radially outside the air-inlet openings, on the filling side (13) of the housing (4), is a collar (22) which, in the filling F position, projects axially beyond the outer border of the introduction opening (6).

4. The apparatus as claimed in claim 1, wherein the filling tube (3, 33) is at least partially secured and sealing in the housing (4, 29) by means of elastic seals.

5. The apparatus as claimed in claim 1, wherein provided beneath the housing (4, 29) is a protecting means which, in the rest position, when there is no container (2) located beneath the apparatus, covers at least the outlet opening (5) of the filling tube (3, 33).

6. The apparatus as claimed in claim 1, wherein provided beneath the housing (4, 29) is a weighing apparatus, on which the container (2) may be mounted.

7. A process for using an apparatus as claimed in claim 1, wherein, for the purpose of filling the container (2), the filling side (13) of the housing (4) is positioned above the introduction opening (6) of the container (2) such that a gap (a) is produced between the filling side (13) and the introduction opening (6), and wherein the arrangement for extracting dust by suction is set in operation at least during filling of the container (2).

8. The process for using an apparatus as claimed in claim 7, wherein the net filling quantity of the container (2) is determined by means of the weighing apparatus at least during filling of the container (2).

* * * * *

UNITED STATES PATENT AND TRADEMARK OFFICE
CERTIFICATE OF CORRECTION

PATENT NO.    : 6,655,425 B2
DATED         : December 2, 2003
INVENTOR(S)   : Wolfgang Doerffel and Siegfried Krieger It is certified that error appears in the above-identified patent and that said Letters Patent is hereby corrected as shown below:

<u>Title page,</u>
Insert item:
-- [30]  Foreign Application Priority Data
Sep. 9, 2000 (DE) Germany …... 100 44 666.3 --

Signed and Sealed this

Twenty-third Day of March, 2004

JON W. DUDAS
*Acting Director of the United States Patent and Trademark Office*